United States Patent [19]
Cicioni

[11] Patent Number: 5,697,546
[45] Date of Patent: Dec. 16, 1997

[54] METHOD OF FORMING A COMPACT HYDRAULIC RADIATOR FOR USE IN CONSTRUCTION EQUIPMENT AND FABRICATION THEREOF

[76] Inventor: Albert Brian Cicioni, 117 W. 22nd St., West Hazleton, Pa. 18201

[21] Appl. No.: 55,632

[22] Filed: Apr. 30, 1993

[51] Int. Cl.⁶ .................................................. B23K 31/02
[52] U.S. Cl. ...................... 228/183; 165/149; 165/150; 165/178; 165/906; 165/916; 165/42; 237/12.3 R
[58] Field of Search ................. 165/42, 149, 150, 165/178, 906, 916; 237/12.3 R; 228/183

[56] References Cited

U.S. PATENT DOCUMENTS

| | | | |
|---|---|---|---|
| 1,805,116 | 5/1931 | Trane | 165/150 |
| 1,891,538 | 12/1932 | Hicks | 165/150 |
| 2,228,550 | 1/1941 | Young | 165/149 |
| 2,248,959 | 7/1941 | Christman et al. | |
| 2,286,271 | 6/1942 | Higham | 165/150 |
| 2,294,030 | 8/1942 | Higham et al. | 165/150 |
| 4,172,493 | 10/1979 | Jacobs | 165/42 |
| 4,938,284 | 7/1990 | Howells | 165/149 |
| 5,085,269 | 2/1992 | Aoki | 237/12.3 R |
| 5,148,863 | 9/1992 | Fouts et al. | 165/149 |

*Primary Examiner*—John K. Ford
*Attorney, Agent, or Firm*—Charles A. Wilkinson

[57] ABSTRACT

Heater coils usually intended primarily for the handling of low pressure heating fluid such as hot water from an engine cooling system are converted to use with elevated pressure hydraulic fluid by tying the inlet and outlet of said coil together with a sturdy structural frame, usually in the form of a plate provided with threaded fittings on one side for connection to hydraulic lines and having the ends of the tubing secured by brazing or other hot metal fusion welding to the rear of the reinforcing plate in alignment with the orifices through the plate. The plate also serves as a safety shield in case of failure of the radiator coils or connections and can also be advantageously applied to radiator coils formed especially for hydraulic heating coils.

3 Claims, 4 Drawing Sheets

METHOD OF FORMING A COMPACT HYDRAULIC RADIATOR FOR USE IN CONSTRUCTION EQUIPMENT AND FABRICATION THEREOF

BACKGROUND OF THE INVENTION

1. Field of the Invention

This invention relates broadly to environmental conditioning or climate control of cabs on heavy construction cranes and other industrial equipment used both outdoors and in large industrial shops. More particularly, this invention relates to the provision of a practical, compact and economical radiator for use in heavy equipment cabs and more particularly still to a method and means for converting heater cores or coils made for hot water heating to heater cores or coils suitable for use with heated hydraulic fluid by means of a special strengthening and safety plate and fitting.

2. Description of the Prior Art

Crane cabs are invariably constructed as compactly as possible so that when the crane rotates along with the cab there will be as little overhang which may strike other objects as possible and to generally allow the maximum freedom of movement for the cab and crane. In addition, such cabs are usually formed largely of glass, at least in the upper portions, to increase the visibility from the cab and consequently the safety of the crane operation. It is seldom if ever that this large expanse of glass will be insulated or double paned and even if it was, the cooling or heating characteristics of the cab in cold or hot weather is very pronounced so that it is difficult to heat or warm or, conversely, to cool, such cabs. The remainder of the cab is usually, in addition, not provided with insulation, even in non-glass areas of the cab, due to cost as well as to internal clearance considerations. The general lack of room in a crane cab, furthermore, means that any heating or cooling equipment such as heating or cooling cores or coils must be very compact so as not to compete for room or space with the operator.

In addition to the room and clearance considerations in a crane cab or similar cabs, the construction of the cab mounting, i.e. so that the cab and crane can pivot in a complete circle, makes it necessary that only special fluids be circulated between the cab and the remainder of the crane. The sliding fluid interconnections used in such universal movement mounts, which replace the usual hose connections customarily used where rotation is less than 360°, can transfer air, water, oil and the like between the rotating structures and the remainder of the crane. However, the seals in such sliding interconnections are not adequate to retain alcohol, ethylene glycol and other antifreeze additions or compositions. Thus, a water-filled heating system, such as might be used within a driving cab or road cab of a crane, truck or other large mobile equipment which is heated by elevated temperature cooling water derived from the engine, is not usable in the operating cab of a crane or the like, at least in northern climates where the water might freeze during stoppages. This is because antifreeze compositions, if used in the system, will leak from such system, not only causing messy conditions and possibly slick and dangerous conditions, but also allowing the water coolant to freeze with possible serious damage to the system.

Prior workers have attempted to avoid these problems by various expedients. For example, electrical heating of the cab has been proposed. See for example, the disclosure of U.S. Pat. No. 2,248,959 issued Jul. 15, 1941 to J. Christman et al. which discloses some of the problems in heating a crane cab and then describes a high wattage electrical heating system. More recently, heat pump-type systems have also been developed for mobile crane cabs.

More recently still, hydraulic fluid heating systems have been developed, for example, see the disclosure of U.S. Pat. No. 4,172,493 issued Oct. 30, 1979 to C. A. Jacobs which uses a restrictor in a hydraulic fluid circuit to heat the fluid from energy developed ultimately by the hydraulic pump and then passes this heated hydraulic fluid through a heat transfer unit to heat an enclosed space or to defrost refrigerator equipment mounted in a mobile vehicle such as a truck or the like. This principle was applied in U.S. Pat. No. 5,085,269 issued to Y. Aoki on Feb. 2, 1992 to the heating of work vehicle cabs such as crane cabs where such cab is rotated through a full 360° circle. In Aoki, the pressure-heated hydraulic fluid is operated against a restriction in a hydraulic line. However, if the hydraulic fluid, which is used also to operate the crane and the like, develops sufficient working heat to be reasonably radiated from a coil, the further addition of heat from a deliberate restriction in the hydraulic line may be unnecessary. In fact, Aoki shows alternative hydraulic circuits with and without restrictions that may be used depending upon the circumstances and the necessity to develop additional heat for radiation from the cab heating system. Such additional heat, for example, is not necessary when it is desired to cool the cab rather than heat it.

The heat transfer units used in cabs and particularly in hydraulically heated cabs have, in general, been in the form of two separate cores or coils, one for the heated hydraulic fluid and one for air conditioning or cooling fluid. There are certain commercial-type heater cores made in a compact form for use in a cab or other restricted space, but such heater cores units have been designed for the circulation through the heating cores or coils of a water solution, which as explained above, is not usable in a 360° turning cab. The heating coils for a water heating system, furthermore, have, in general, not been suitable for use with hydraulic heating systems, because their construction and particularly their connections have not been sufficiently strong to handle the increased stress of hydraulic fluid held under pressure.

As will be understood, when hydraulic fluid or other fluid is heated by increasing pressure as by a restriction in a line or the like, if the heat is to be retained and then radiated from a heat transfer unit, it is desirable to substantially maintain the pressure in order to retain the heat in the fluid until it can be radiated away in a coil or core, rather than having the heat values dissipated by decreasing the pressure, in which case some of the heat would be dissipated into at least a slight expansion plus possibly some vaporization of the liquid. However, the requirement to maintain the pressure of the fluid means the heating coil is exposed to substantial pressure and, if it is not designed to such pressure, failure may take place.

One of the problems with hydraulic heater coils as indicated above, is that special coils and fittings should be made for the high pressure encountered. However, while there are quite a number of water coils or cores made, very few hydraulic cores or coils are fabricated and the cost of such special heat transfer units is rather high.

It would be advantageous, therefore, if the fairly numerous and readily available heater coils fabricated for use with water or water solutions could be converted to use with hydraulic fluid.

The present inventor has after substantial experimentation, discovered that commercially available water heater coils can be converted to hydraulic fluid coils for use in the cabs of cranes or other heavy construction or industrial equipment conveniently, efficiently and safely by the use of a special frame member which is especially fabricated to rigidly connect the two connecting ends of the heating coils together into a single monolithic safety unit or core.

OBJECTS OF THE INVENTION

It is an object of the invention, therefore, to convert a heater coil designed for use with elevated temperature water to a heater coil suitable for use with elevated pressure hydraulic fluid.

It is a further object of the invention to fabricate a hydraulic fluid heater coil from a heater coil designed for use with heated water.

It is a still further object of the invention to secure the two connecting ends of an aqueous heater coil to a frame which effectively converts such heater coil to a hydraulic fluid coil or core.

It is a still further object of the invention to strengthen a water heater coil by securing the inlet and outlet ends to a reinforcing frame that ties the two ends rigidly together allowing the heater coil to be safely used as a hydraulic fluid radiator heat transfer unit.

It is a still further object of the invention to provide a compact heater core for use in the cabs of construction and other heavy industrial equipment.

It is a still further object of the invention to weld the two ends of a heat dissipating coil to the surface of a rigid plate which is provided on the opposite side of such plate with threaded fittings having angular wrench surfaces associated with them.

It is a still further object of the invention to provide a multi-coil in-line environmental apparatus or comfort system having a cooling coil and a hydraulic fluid heating coil for heavy equipment cabs, wherein the hydraulic coil is rendered suitable for in-line use by means of a strengthening plate to which the two ends of the hydraulic heating coil are attached rendering said coil structurally rigid with respect to the ends, but leaving the intermediate portion of the coil free for at least limited movement or adjustment with changing internal pressures.

It is a still further object of the invention to provide a substantial safety shield at the most likely failure point of an environmental or comfort unit while closing off access or exposure to the coil by a rigid shielding plate.

It is a still further object of the invention to mount a heating coil in an environmental unit for cooling and heating with the coil securely mounted in the unit with the aid of a reinforcing frame in the form of a rigid plate rigidly secured to the end of the two ends of the coil.

Other objects and advantages of the invention will become evident from a careful study of the following description and appended drawings.

BRIEF DESCRIPTION OF THE INVENTION

An environmental unit or comfort unit for heating and cooling of a cab for heavy mobile cranes and the like is provided by obtaining a water-type heat transfer or radiation unit and converting it to a hydraulic fluid unit by welding across the two ends of the water radiation or heating coil unit a rigid strengthening and safety plate at the location of two contiguous orifices in such plate which also includes two threaded fittings secured to the opposite side of the plate in line with the orifices and which preferably has a pair of angular wrench engaging flats about the base of said threaded fittings. The reinforcing plate provides rigidity to the ends of the hydraulic coil, serves as a shield to prevent spraying of hot hydraulic fluid at high pressure from the heat transfer unit at the point of exit of the hydraulic lines from the environmental unit in case of accident or failure and serves to create a high pressure hydraulic fluid heater core from a low pressure water heater core. The plate unit serves also to mount the coils within the principal environmental casing as well as to block or shield the connecting opening to prevent hot high pressure hydraulic fluid from spraying into the cab in case of failure. The plate of the invention can also be effectively used with heater coils originally designed as hydraulic fluid coils.

DESCRIPTION OF THE PREFERRED EMBODIMENT

Figure 1:
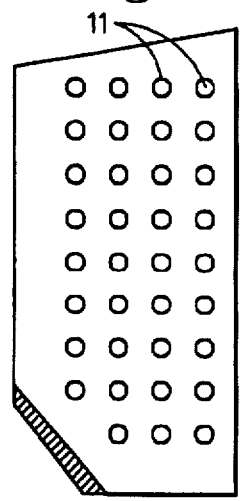
FIG. 1 is a diagrammatic broken-away side elevation of a heater core in accordance with the prior art designed for the receipt of hot water for radiation of the heat of such water to a surrounding enclosed environment.

As explained previously, water heater coils are not suitable for use in the operating cabs of completely rotatable cranes and the like due to the inability to retain various forms of antifreeze in a sliding water transfer coupling having a 360° rotation capability. Heat from the drive engine cannot, therefore, be transferred to the rotating cab, at least in climates where the temperature normally goes, or may be expected to go, below freezing.

Several different systems for heating the cabs of cranes and the like have been developed which do not depend upon the transfer of heat from water. Among these are the use of electrical resistance heating, the use of a heat pump system and the use of heated hydraulic fluid from the crane operating system. The most practical and least complicated of these systems is the use of heated hydraulic fluid which is present, in any event, in the crane cab, usually as a part of the controls of the cab.

As may or may not be evident, the normal water heater coil may not be suitable for use as a heater coil for hydraulic fluid which is under pressure. While the coils of many water-type heater coils may well be heavy enough for retaining hydraulic fluid under pressure, extreme difficulty has been encountered in making connections with such coils between hydraulic lines and the coil. Normally such connections must be threaded connections to retain the pressure of the hydraulic fluid, but it has been found that a mere threaded connection is not satisfactory over a period, because the connection soon starts to leak. In general, therefore, special hydraulic heater coils have been designed and constructed for use in such installations. Such units are expensive and have not been available in sizes which can readily be fitted into a single casing for both a cooling coil for air conditioning and a heating coil for heating. Instead, separate heating and cooling coils have usually been used and fitted into any available individual spaces in the crane cab.

Unitary environmental units or climate control systems have also been available for use in the driver's cab and other locations for heating and cooling using heated water for the heating medium. However, as explained, these units could not be used in the cabs of large cranes and the like, at least in climates subject to freezing weather or the possibility of freezing weather, because no satisfactory way of establishing a reliable connection with the heating coil was available.

The present inventor has, after long experimentation and study, discovered an effective way of establishing a reliable and essentially foolproof connection between a heating coil designed for use with hot water and a hydraulic system kept under or subject to elevated pressures. Such connection system can also be used with good effect for hydraulic heating cores or coils especially made for hydraulic heating installations. It is particularly useful, however, for adapting other normally hot water radiators to use with hydraulic heating systems.

Applicant's system involves the use of a rigid frame upon which are mounted threaded fittings for connection to the hydraulic system lines and to the rear of which are attached by brazing or the like the inlet and outlet lines of the heating coil. Preferably the rigid frame is comprised of a rigid metal plate and the fittings or some other portion of the plate also preferably have angular wrench engaging surfaces adjacent the threaded sections to which a wrench may be attached when hydraulic line fittings are being threaded onto the threaded fittings on the plate. Such plate can be inserted into a holder or clipped onto the surface of the radiator casing and aids therefore in stabilizing the radiator within the casing. The plate also covers the exit from the casing which is originally designed as a hot water heating environmental casing and serves as a safety shield for deflecting any possible stream of high pressure liquid which might tend to spray or jet from a leak in the system, for example, if one of the coils should spring a leak or if one of the connections fails.

It has been found that the tying of the outlet and inlet of the radiator together by the rigid frame or plate allows the radiator coils to flex with pressure changes, but rigidly holds the connections against any movement whatsoever with respect to each other and thus prevents failure of the connections within the hydraulic system. The wrench flats preferably provided on the fittings welded to the plate, furthermore, provide a wrench contact surface which can be reinforced by a wrench during threading of the hydraulic line fittings over the threaded plate fittings allowing the reinforcing plate to be further steadied during such threading. Tying the two portions of the radiator coil together, furthermore, effectively reinforces both the outlet and inlet so that the entire assembly is very strong in itself and can withstand not only all sorts of vibration and the like, but can also withstand considerable torque stress during interconnection with the hydraulic lines.

Referring more particularly to the attached drawings, FIG. 1 shows a diagrammatic view of a typical heat transfer unit assembly used for hot water heating of various spaces, including the passenger's and driver's cab of motor vehicles or other equipment. In FIG. 1, a series of coils 11 formed from hollow tubing are shown mounted within a casing 13. Such tubing may be copper tubing or other tubing. An opening 15 on the side of the casing 13 provides an entrance for an inlet 17 of the coils 11 and an outlet 19 for the coils 11. Such inlet and outlet are provided with standard tube connection fittings 21 which it will be understood frequently comprise ferrules as shown, which, when the tubing is connected to another tubing is compressed within a suitable connector. While such fittings are adequate for retaining low pressure fluids when connecting low pressure tubing and the like, they are in general not suitable for retaining high pressure fluids or for use with high pressure tubing.

Figure 2:
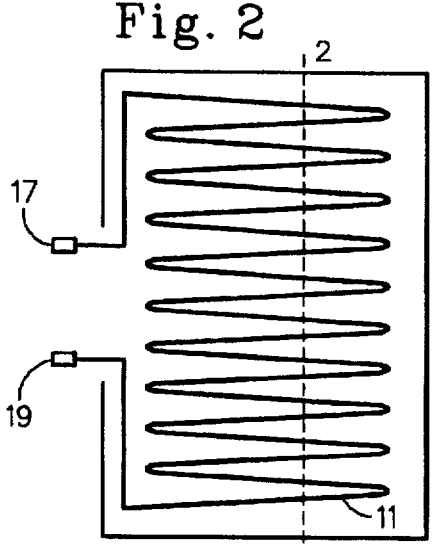
FIG. 2 is a section 2—2 through the heater core shown in FIG. 1.

FIG. 2 is a vertical section through the heater coil assembly shown in FIG. 1 along section 2—2 and shows that the series of coils 11 shown in FIG. 1 actually are comprised of several layers or rows. FIGS. 1 and 2, as indicated above, are views of a prior art heat transfer assembly including hot water radiator-type heating coils of a typical construction.

Figure 3:
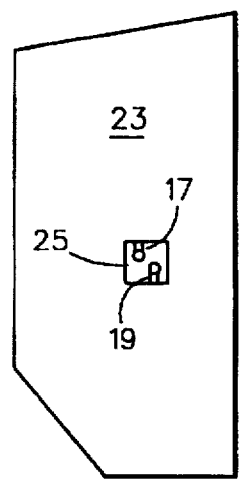
FIG. 3 is an end view of the heater core unit shown in FIG. 1 showing the opening in the casing through which protrude the inlet and outlet of the radiator itself for the connection of suitable fittings.

FIG. 3 is an end view of the radiator assembly 9 shown in FIG. 1 showing the end casing 23 which is provided with an opening 25 through which the inlet and outlet tube ends 17 and 19 normally pass, as may be seen in FIG. 3. It will be understood that the individual heater coils 11 shown in FIGS. 1 and 2 may be mounted in a conventional manner in a light supporting framework, not shown, within the casing 13.

Figure 4:
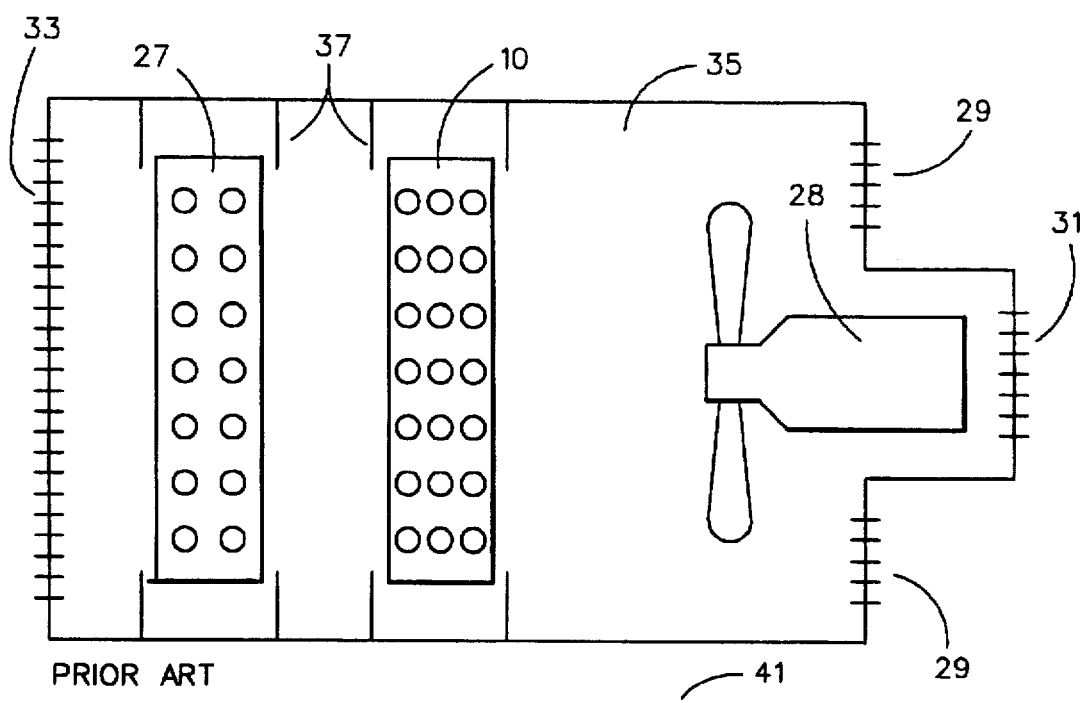
FIG. 4 is a diagrammatic section through an environmental unit incorporating a cooling core, the heating core of FIGS. 1, 2 and 3 and a fan for moving air past the two cores or coils.

FIG. 4 shows an overall environmental conditioning unit or comfort system including the radiator heating coil assembly 9 shown in FIGS. 1, 2 and 3 plus a cooling coil or core unit 27 of any suitable description and an air mover or fan 28 which, as will be understood, will draw air through the registers 29 and 31 at the right of the unit and will expel such air either cooled or heated after having passed through the coils 10 or 27 through the register 33 at the left of the unit. As will be understood, however, the air could very well be drawn through the unit in the opposite direction and the fan or air mover 28 could be arranged at any point within the unit in order to move the air through the coils in such unit.

There is frequently an opening such as a door or the like, not shown, in the side of the casing 35 so that the coil units 10 and 27 may be withdrawn from the casing 35 at will for repair or cleaning and may be easily reinserted into the casing where they are held by the guides 37 provided within the casing 35. As will be understood, heating fluid lines, not shown, will be connected within the casing 35 with the heating coil 10 and similar cooling coil lines will be attached to the cooling coil 27 within the casing 35 in any conventional manner.

Figure 5:
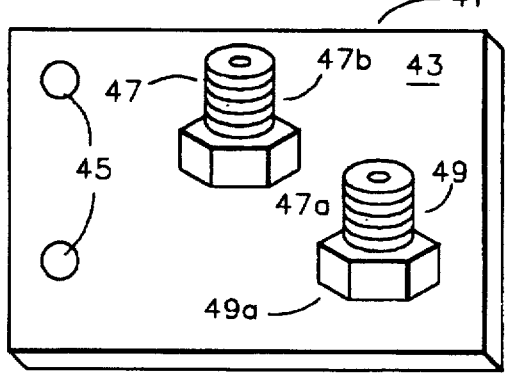
FIG. 5 is an isometric view of the top or connection surface of a reinforcing frame or plate of the invention.
Figure 5A:
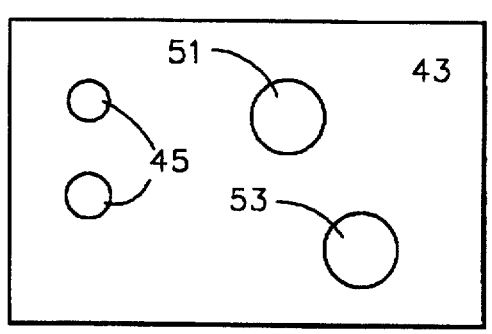
FIG. 5A is a plan view of a reinforcing plate prior to the attachment of the threaded fittings of the invention over the orifices in the plate.
Figure 6:
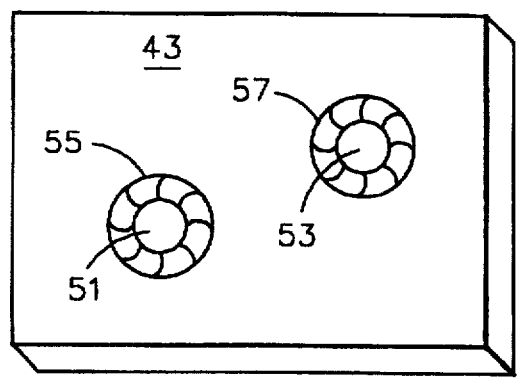
FIG. 6 is a bottom view of the reinforcing frame or plate of the invention showing the orifices through the plate plus the welds which secure the top or outside fittings to the plate.

In FIG. 5 there is shown a frame 41 comprised, as shown, of a flat structural plate 43 having two mounting orifices 45 at one end by which the plate 43 may be mounted in place by any suitable fastening, or in many cases, merely left free. The plate structural 43, which may be formed preferably from approximately 1/16th to 3/32nd of an inch in thickness rolled carbon steel sheet stock and will usually be satisfactorily about 1/8th of an inch in thickness, is provided on one side with securely attached threaded fittings 47 and 49, 47 conventionally being the fitting which is connected to the inlet 17 of or to the coils 11 and fitting 49 conventionally being the fitting which is attached to the outlet 19 of the coils 11. As will be seen in FIG. 5A which shows the framework or plate 43 before the fittings 47 and 49 are attached to such plate, said plate 43 is provided with two matching orifices 51 and 53 over which the threaded fittings 47 and 49 are ultimately securely mounted. The bottom of the fittings 47 and 49 are shown in FIG. 5, preferably in the form of octagonal wrench-fitting forms 47a and 49a to which wrenches may be readily attached to hold the assembly steady while threaded fittings, not shown, are threaded over the threaded portions 47b and 49b to attach hydraulic lines extending from a hydraulic system within the cab to the fittings 47 and 49. The fittings 47 and 49 are preferably welded to the plate 43 by a soffit weld 55 which is shown in FIG. 6. FIG. 6 is a view of the plate 43 from the opposite side. It will be noted in FIG. 6 that weld beads 55 and 57 are solidified within the orifices 51 and 53 bridging the side of the orifices and the back of the fittings 47 and 49 and serving to very securely attach said fittings 47 and 49 to the plate 43 in alignment with the orifices 51 and 53.

Figure 7:
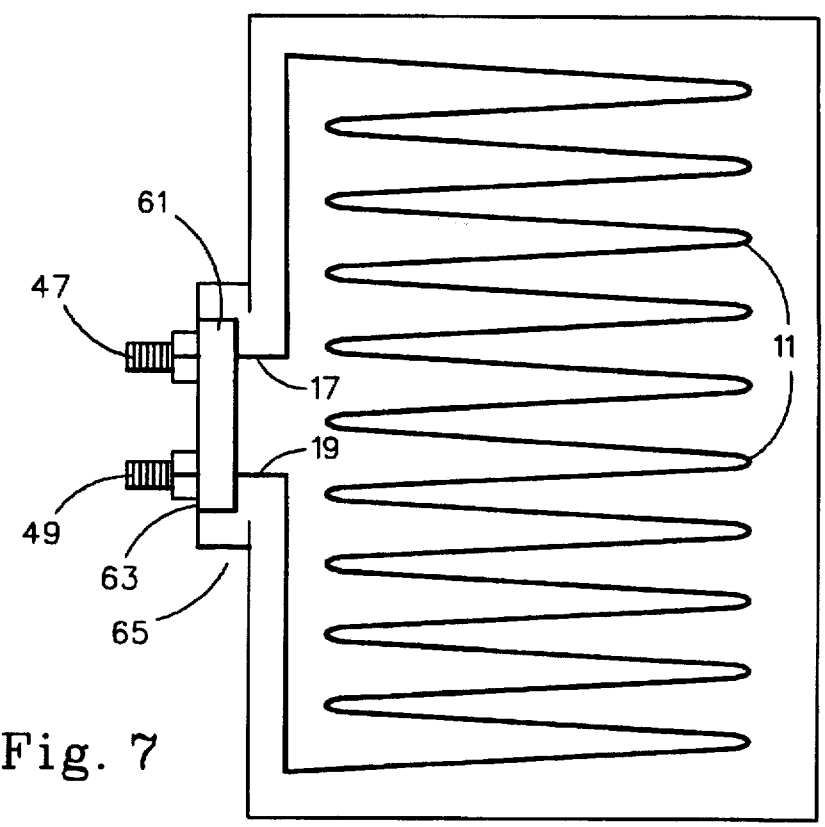
FIG. 7 is a broken-away diagrammatic side view of the cooling system or unit of the invention showing the reinforcing frame or plate from the side mounted on the side of the casing for the coil unit.
Figure 8:
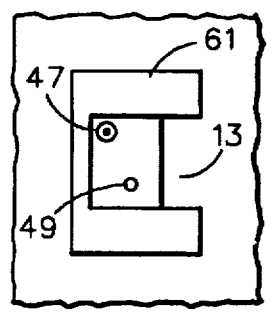
FIG. 8 is a partially broken-away end view of the central section of the unit shown in FIG. 7 showing the fittings ready for connection to hydraulic lines and held by being inserted into a slot on the surface of the casing of the radiator.
Figure 9:
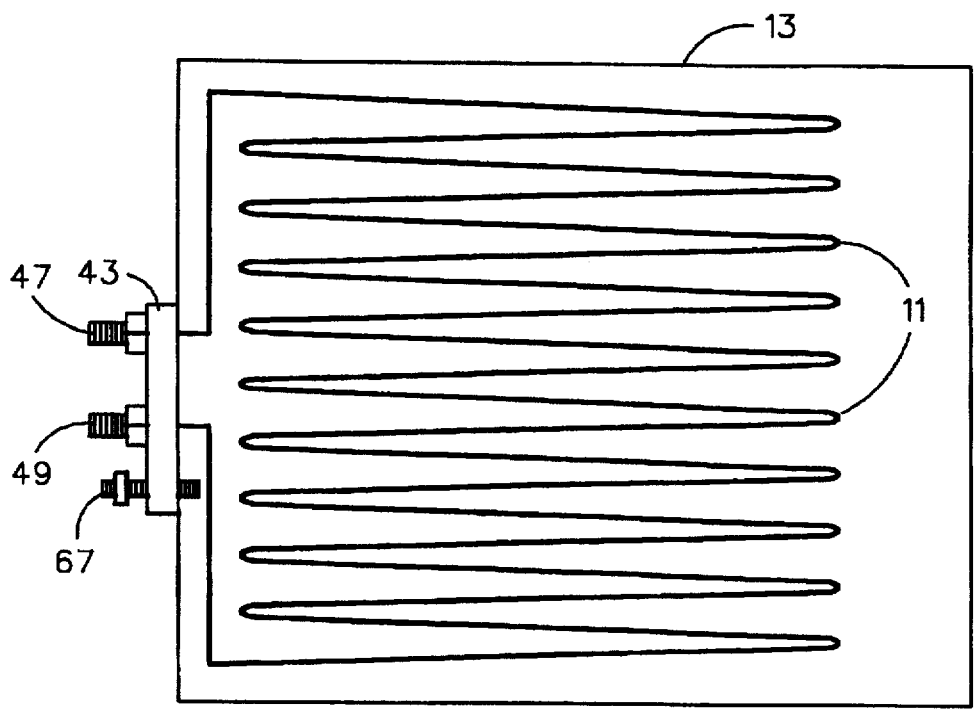
FIG. 9 is a diagrammatic broken-away side elevation of a heater core in accordance with the present invention showing the reinforcing frame or plate of the invention from the side mounted on the side of the casing for the coil unit and attached to such casing through threaded fastening means.

FIG. 7 is a partially broken-away diagrammatic elevation of the coils 11 within the casing 13 attached preferably by brazing at the inlet 17 and outlet 19 to the back of the plate 43 in alignment with the orifices 51 and 53. Such brazing serves to securely attach the coils 11 to the plate via their inlets and outlets and provides a very sturdy unitary coil, the ends of which are secured together through the framework or plate 43. It has been found that this securing together of the inlet and the outlet plus the sturdy nature of the plate 43 provides an extremely vibration resistant assembly which easily resists vibration, shocks and other detrimental forces which might tend to cause leaking of either the tubing or the fittings. It has been found through experimental work over an extended and continuous period, that these fittings are effective to prevent leaking of the coils under extreme conditions. Furthermore, securely attaching the inlet and outlet ends of the coil through the plate together basically stabilizes the ends of the coil and prevents vibration of such ends, yet leaves the remainder of the coil somewhat free to adjust and vibrate due to the shocks of sudden changes in the pressure of the hydraulic fluid passing through the tubing as well as external shocks applied to the system and other stresses. As seen in FIG. 7 and also in FIG. 8, which is an enlarged view of the plate viewed from the end as shown in FIG. 7, the plate 43 is received and held within a pocket 61 formed by thin plates 63 and 65 welded or fabricated together so as to form a pocket into which the plate 43 may be slipped together with its connections and in which it is retained slightly loosely but prevented from major movement. It will be noted that the plate 43 is brazed to the inlet and outlet of the tubing 11 so that the plate is positioned beyond the edge of the casing 13 and preferably held exteriority of the casing by a retainer of some form such as the pocket 61. However, the plate 43 may also be attached to the surface of the casing 13 by means of a threaded fastening 67 or the like passing through the orifices 45 and secured to the casing 13 by threading into or through the casing as shown in FIG. 9.

Assuming the coils 11 of the heating coil 10 are formed from copper, the hot-rolled sheet stock from which the plate 43 is formed may be attached to the coils by the use of a solder composition comprised of silver 45%, copper 15%, zinc 16% and cadmium 24%. This type or composition of silver solder may be very effectively used to fuse or braze a copper coil to the back of the rolled steel stock. The brazing provided is strong and vibration-resistant and is found to do an excellent job. The fittings 47 and 49 will be effectively welded to the plate 43 by the use of a stainless steel-type welding material.

Figure 10:
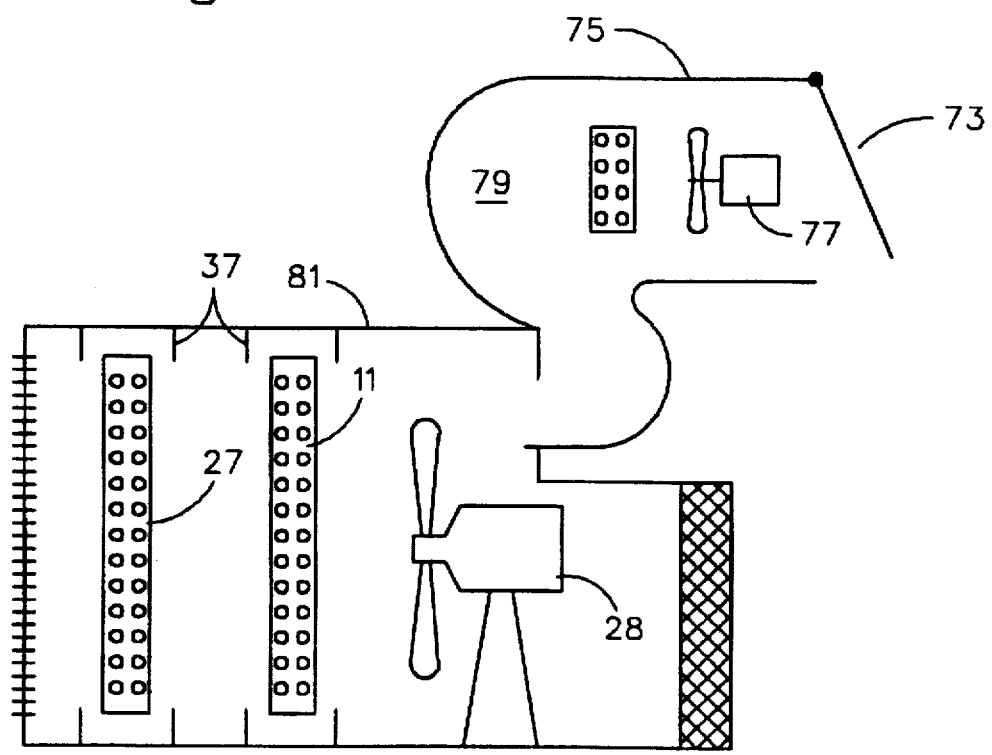
FIG. 10 is a diagrammatic section through an environmental unit incorporating a cooling core, the heating core of the invention, a filter for obtaining filtered and either heated or cooled air plus an outside source of filtered and pressurized air.

In FIG. 10 the invention is shown applied to an environmental or comfort system which incorporates a multiple operational system in which several modes of operation can be chosen including the recirculation of filtered air taken from the cab and recirculated through the system basically as shown in the prior art system shown in FIG. 4 except that the air entering the comfort unit through the filter 71 from the air within the cab is filtered as it is recirculated. To obtain unfiltered air all that is required is that the filter 71 be removed or opened in any effective manner. When pressurized external air is desired to be added to the system, the hinged cover 73 on an outside air inlet 75 is opened and a forced circulation fan 77 activated to draw in air from outside the system which is forced by the blower or fan 77 through a filter 79 mounted in the fresh air intake and passed under forced draft into the comfort unit 81. The filtered air then passes through the heating coil 11 and the cooling coil 27 with its temperature adjusted depending upon whether the unit is in heating or cooling mode and is expelled into the cab through the register 33. Since the air is forced into the cab through the comfort unit from the outside the unit and through it, the cab atmosphere is pressurized and at a slightly higher atmospheric pressure which prevents any air from entering except through the filter in the outside air vent. The multiple operational mode unit complies with all EPA requirements for such system.

The invention has been found to be extremely effective in providing a leakproof assembly of a structural reinforcing plate which also serves as a shield in case of any possible leaks in the system and which prevents the development of leaks in the tubing arrangement as well. The arrangement enables radiator coils made for handling water to be easily converted to use for hydraulic fluid with complete safety and efficiency and has solved a serious problem in the production of hydraulic coils for heating crane cabs and the like with hydraulic fluid. While the radiator coils have been shown in the figures diagrammatically in our particular form it will be understood that radiator coils could be in almost any form, for example, coiled back and forth next to each other, in concentric coils, descending coils intertwined or in almost any other form as long as the reinforcing plate of the invention is secured across the inlet and outlet.

While the present invention has been described as some length and with some particularity with respect to several described embodiments, it is not intended that it should be limited to any such particulars or embodiments or any particular embodiment, but is to be construed broadly with reference to the appended claims so as to provide the broadest possible interpretation of such claims in view of the prior art and therefore to effectively encompass the intended scope of the invention.

Figure 11:
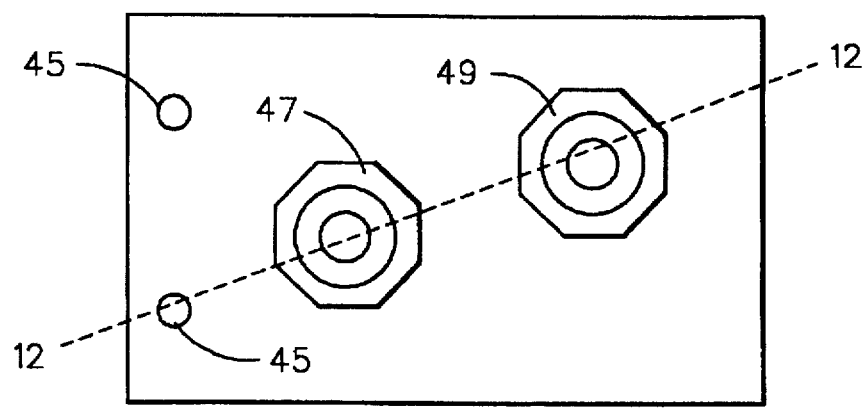
FIG. 11 is an enlarged front view of the reinforcing plate shown in FIG. 7.
Figure 12:
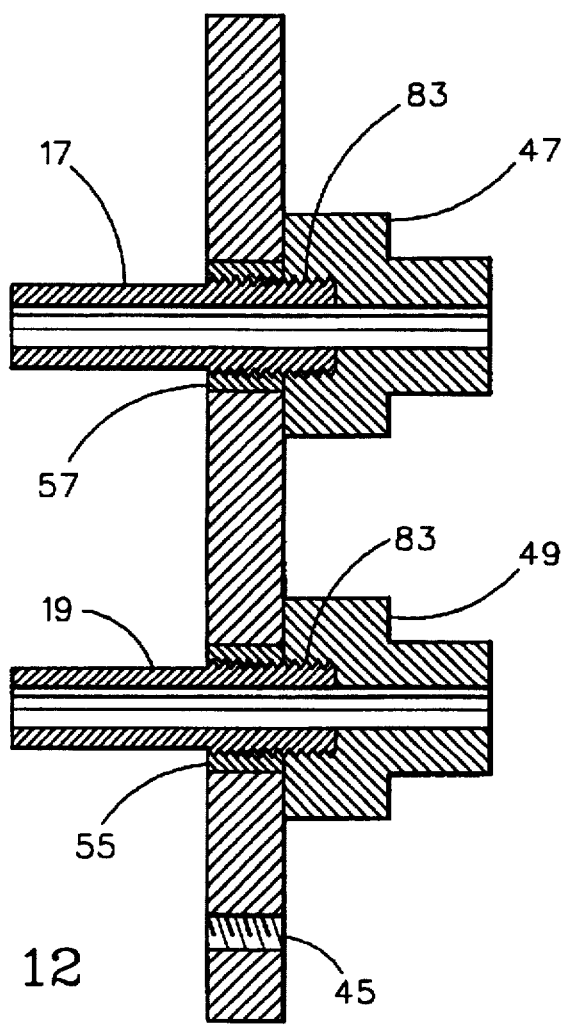
FIG. 12 is a cross section 12—12 through FIG. 11 showing the attachment of the heating coils and threaded fittings to the reinforcing plate.

FIG. 11 is a front view of the frame or structural plate of the invention showing the same structures or parts as in FIG. 5, but from directly above or in front. FIG. 12 is a cross section along section 12—12 in FIG. 11 showing how the fittings 47 and 49 are soffit welded to the plate 41 over orifices 51 and 53 shown in FIGS. 5A and 6 and showing how the ends 17 and 19 of the coil are conventionally brazed to the opposite side of the plate 41. As is conventional in brazing, the end of the tubes are dipped into or painted with the brazing alloy and then inserted into the orifices 51 and 53 and the brazing alloy allowed to solidify. Since the interior of the orifices 51 and 53 already have soffit welding material 56 and 57 in them as shown in FIG. 6 from the prior soffit welding of the fittings 47 and 49 to the plate 41, the brazing of the tube ends 17 and 19 is to such soffit weld material 55 and 57 plus to any internal portion of the fittings 47 or 49 into which the ends of the tube extend. In FIG. 12 the extremely thin layer 83 of solidified brazing alloy securing the tube ends 17 and 19 to the plate 41 and to the interior of the fittings 47 and 49, if so secured, is located circumferentially between the tube ends 17 and 19 and the surrounding structures. As is conventional in brazing an attempt to overlap the tube ends 17 and 19 with as much other structure as is possible will usually be made, although a secure attachment may be attained by attaching the tube ends only to the soffit weld material within the orifice in the plate itself.

I claim:

1. A method of providing a small single unit combined air conditioning and heating unit for use in operator's cabs of heavy hydraulic equipment comprising:

(a) providing a multi-coil air conditioning and heating unit casing having, within said casing, separate multi-coil cooling and heating coils for a cooling fluid and a heating fluid respectively arranged in line with each other and substantially adjacent to each other together with air moving means arranged for drawing environmental air sequentially past said cooling and heating coils, said heating coil being at least partially flexible in response to hydraulic pressure alterations within said coil, (b) fabricating a vibration damping, stiffening and strengthening frame means having a first side and a second side for unitizing the outlet and inlet of said heating coil inclusive of securely welding threaded fittings about two adjacent openings in a first side of a structural plate means having sufficient stiffness to retain said fittings completely immobile relative to each other, and a sufficient dimensions to transversely intersect both the inlet and outlet of the heating coil, (c) aligning the inlet and outlet of the heating coil with the two adjacent openings in the structural plate means and metallurgically fusing the inlet and outlet of said heating coil to a second side of the structural plate means about the openings in said structural plate means with an unobstructed passage from said outlet and inlet respectively on the second side of the structural plate means through the respective openings in said structural plate means and the fitting on the first side of the structural plate means with the threaded fittings extending outwardly from the heating coil a predetermined distance sufficient to extend beyond the edge of the casing when the coil is mounted in the casing, and (d) mounting said heating coil in the casing with the frame means adjacent one wall of the casing and the inlet and outlet of the heating coil securely attached via the threaded fittings to a system for providing heated hydraulic fluid to the inlet of the coil and for removing hydraulic fluid from the outlet of the coil.

2. A method of providing a small single unit combined air conditioning and heating unit in accordance with claim 1 wherein the threaded fittings welded to the structural plate means are welded thereto with angular wrench engaging surfaces positioned between the structural plate means and the threaded section of said fittings.

3. A method of providing a small single unit combined air conditioning and heating unit in accordance with claim 2 wherein the frame means is formed from a stiff plate means and is at least partially secured to the casing.

* * * * *